Aug. 15, 1972   J. W. GRAINGER   3,684,606
METHOD OF MAKING REINFORCED BELTING
Filed June 24, 1969   3 Sheets-Sheet 1
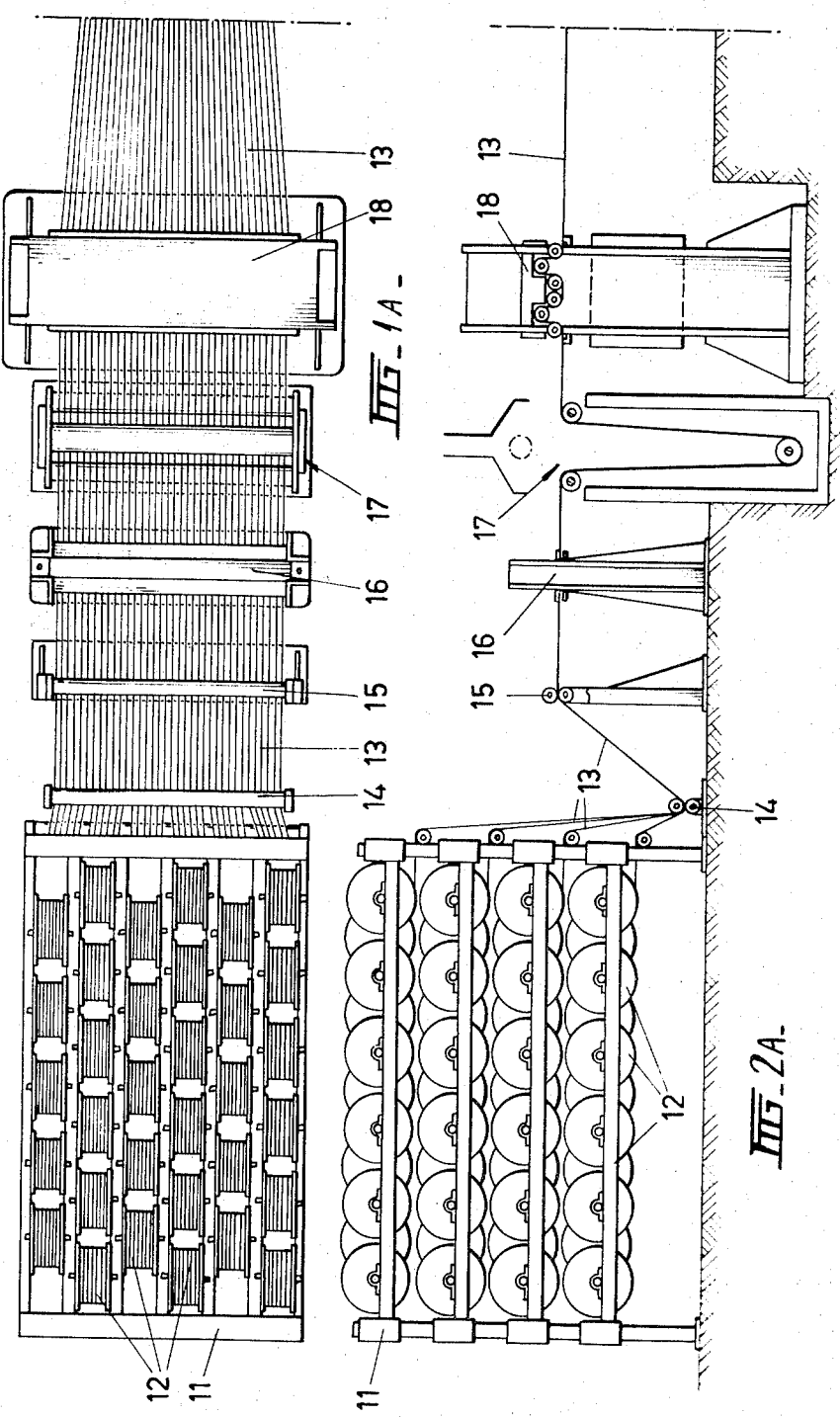
INVENTOR
JOHN W. GRAINGER

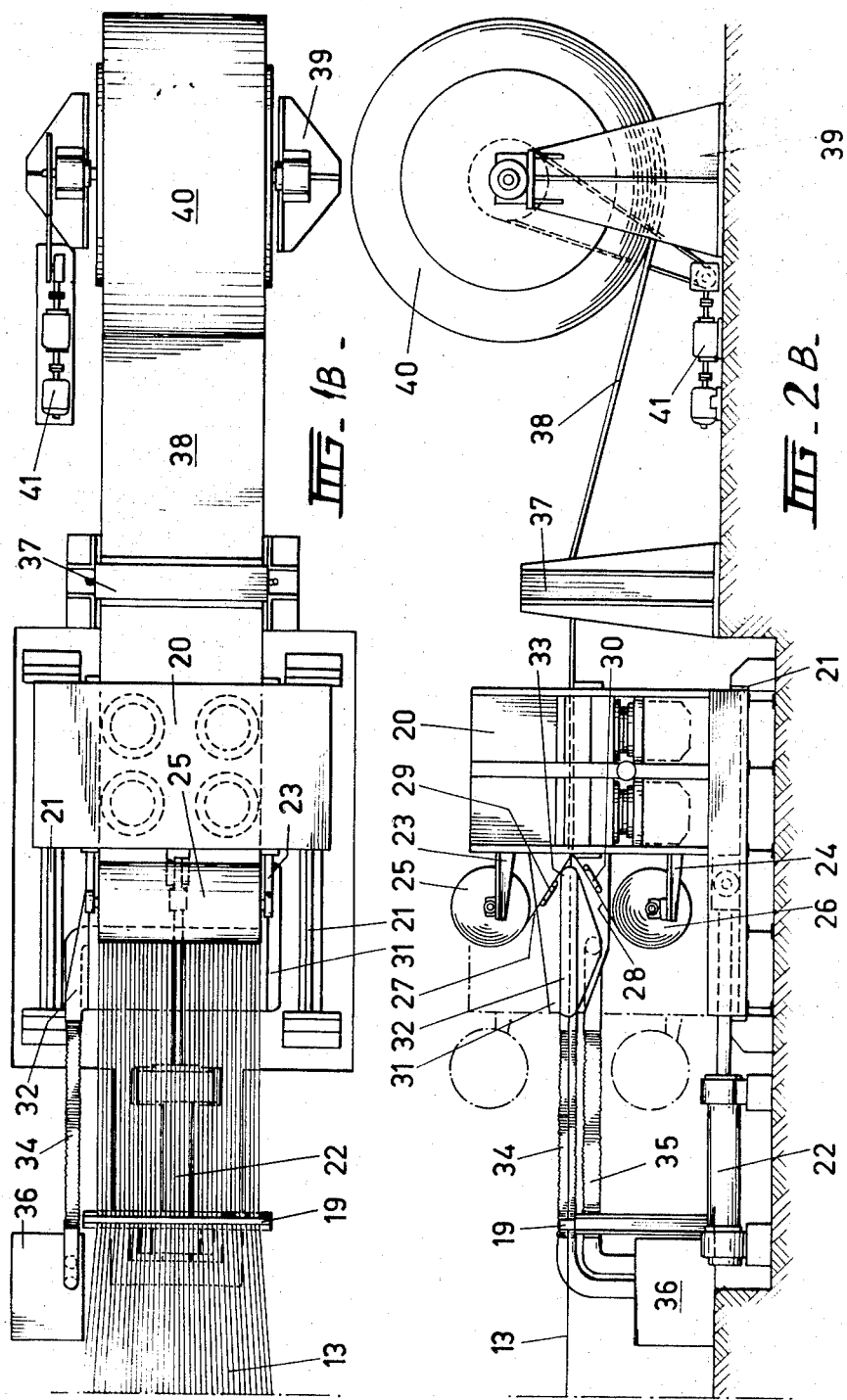

Aug. 15, 1972  J. W. GRAINGER  3,684,606
METHOD OF MAKING REINFORCED BELTING
Filed June 24, 1969  3 Sheets-Sheet 3
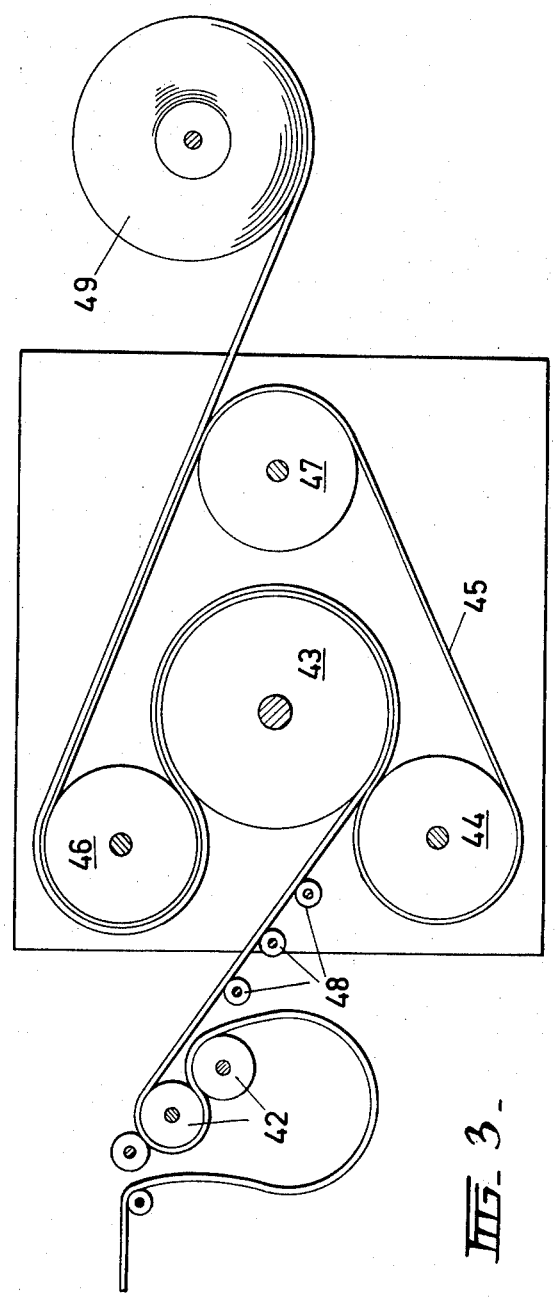
INVENTOR
JOHN W. GRAINGER

United States Patent Office 3,684,606
Patented Aug. 15, 1972

3,684,606
METHOD OF MAKING REINFORCED BELTING
John W. Grainger, Newport, New South Wales, Australia, assignor to Olympic General Products Proprietary Limited, West Footscray, Victoria, Australia
Filed June 24, 1969, Ser. No. 835,980
Claims priority, application Australia, June 24, 1968, 39,606/68
Int. Cl. B32b 5/00; B32f 29/02
U.S. Cl. 156—137                                    13 Claims

ABSTRACT OF THE DISCLOSURE

A method of making reinforced belting comprising advancing two elastomeric cover plies with an array of spaced parallel inextensible cords intermittently through a platen press and a clamp, the cords previously passing through another clamp and a tensioning device. The press, clamp and tensioning device are operated to compress lengths of the plies and cords sequentially into a consolidated assembly by a pressure of up to 800 lbs. per square inch, the cords being tensioned while compression takes place, and the cords and plies being advanced between each compression by the press length. The cords or ply faces may be heated to 200° F. before compressing to ensure penetration of the cord interstices. Vulcanisation is performed subsequently in a rotary vulcanising apparatus modified to ensure entry tangential to the rollers thereof.

---

This invention relates to a method of making reinforced belting and is concerned more particularly with conveyor belting reinforced with ropes, cables or similar clusters of filaments, hereinafter termed "cords." The invention has particular application in respect of relatively inextensible cords.

Conveyor belts, reinforced with longitudinally placed cords of steel or other relatively inextensible materials, which cords are set in a resilient medium such as rubber or plastics, have proved very useful in modern mining practice where their low stretch characteristics, good ability to trough and high tensile strength have been particularly advantageous in relation to the long belt lengths now used. The high tensile strength of such belts enables them to handle heavy loads over long distances.

In the manufacture of belts using relatively inextensible materials, and particularly steel cords, it is necessary to apply considerable tensile force to the cords to ensure that the cords are straight and parallel to each other.

It is known that steel cord reinforced belts can be made by a method whereby each steel cord is individually tensioned, and the resilient covers which have been previously assembled around the cords are vulcanised in a step by step process in which a fixed or mobile press able to impart heat and high pressure to the assembled belt is used to vulcanise it, section by section, while a sizeable length of the belt is kept under tension. Hitherto it has been considered essential for that part of the assembled belt which is being vulcanised to be maintained under high pressure of the order of several hundred lbs. per square inch while the vulcanisation proceeds. The present invention is based on the discovery that a satisfactory belt can be produced without requiring heavy vulcanising pressure, and is broadly characterised by the step of applying high pressure to compress the cover plies and cords together in sections, vulcanisation being carried out subsequently after the high pressure has ceased to be applied. Surprisingly it has been found that once the tensioned cords and the cover plies have been consolidated by the high pressure compression, a satisfactory belt can be made by vulcanising the assembly under comparatively low pressure, and that a considerable time delay may occur between the consolidation and the vulcanising, even permitting the consolidated assembly to be rolled and stored and/or transported to another place before vulcanising, without reducing the quality of the product. It has been found that pressures of the order of 500–600 lbs. per square inch and up to 800 lbs. per square inch are desirable for the consolidation step.

A pre-requisite for high quality in steel cord reinforced conveyor belts is that there should be an even and substantially parallel relationship of the longitudinally placed steel cords to each other. A known form of apparatus which is suitable for curing textile fabric reinforced elastomeric belts is the continuous rotary vulcanising apparatus commercially available under the names Rotocure and Auma. In using such an apparatus the fabric plies and ealstomeric covers are individually tensioned and are fed into the apparatus individually where they are consolidated into a unity at the entrance nip of the apparatus. In some instances the fabric plies and elastomeric covers are lightly consolidated beforehand by passing them through the nip of a pair of rollers one or both of which may be driven, as the lightly-consolidated assembly may be easier to align entering the rotary apparatus, particularly where there is a large number of plies. The rotary apparatus continuously vulcanises a sheet of conveyor belting and predetermined tension is able to be applied continuously to the ingoing belt between the rotary vulcanising apparatus and the hold-back equipment which precede it. This apparatus is able to apply a very even tension and very even state of vulcanisation by virtue of its continuous nature.

When curing such conveyor belting in such a rotary apparatus, it has always been normal practice to apply a pre-determined tension to the ingoing belt in order to remove as much inherent stretch as possible from those inextensible components of the fabrics which lay in the longitudinal direction. While being held in this stretched condition these longitudinal components have vulcanised or fused around them the elastomiric material which even after shrinking during cooling will still hold the longitudinal fabric components in a substantially elongated or stretched condition. Thus it is possible to produce conveyor belting, which, when made endless and highly tensioned for travelling and tracking purposes, will not stretch anywhere near to the same extent as similar belting which is not vulcanised in a pre-stretched condition as previously described. Conveyor structures take-up units or similar provisions for belt stretch in service and are therefore less expensive. In addition high belt stretch in service in always accompanied by proportionate loss of belt width which reduces the effective surface area available for transporting materials.

In addition to the advantages to be gained by vulcanising fabric cord or ply reinforced belting in a pre-stretched condition as previously described it has been found in practice that not only is this technique advantageous for reasons given, but indeed essential to the art of continuous rotary vulcanisation as when feeding a sheet of any material including consolidated belting or belting in component form continuously into a rotary vulcanising machine without tension being applied to the ingoing sheet or components, there is an objectionable tendency for the sheet or components not to follow an ideally straight path but to "wander" from side to side even to such an extent as to make continuous vulcanisation impossible. When applying tension to the ingoing sheet or components it is a feature that the highest tension is automatically applied to that side of the sheet which reveals a tendency to "wander" from the ideal centre line and this tension so arrests such wander.

The idea of vulcanising conveyor belting reinforced with longitudinally placed cords or cables as previously described in a rotary continuous vulcaniser has always been repugnant owing to the fact that on one hand the necessity to arrest wander by tension has been recognised while on the other it was considered that such tension would result in the cords being pulled in an uncontrollable manner through the heat softened cover on the inner arc of the belting as it passed through the curing zone.

The present invention, involving the step of a preliminary high pressure consolidation, and the subsequent step of continuous rotary vulcanisation can be carried out to produce conveyor belt reinforced with metal cord or other relatively inextensible cord, hereinafter termed "inextensible cord belts," so as to achieve the desired qualities of even tension and substantially parallel relationship of the longitudinally placed cords and to take advantage of the even state of vulcanisation resulting from use of the rotary vulcanising apparatus, while controlling the position of the cords within the cover material.

Thus a method of producing inextensible cord belts according to one preferred aspect of this invention comprises extending an array of cords, extending two cover plies one on each side of the array of cords, applying high pressure by means of a platen press to compress the cover plies and cords together over sections of the cover plies and cords sequentially and maintaining the cords under tension during each compression, effecting advancement of the cords and cover plies relative to the platen press between consecutive compressions, by a distance not greater than the length of each section, and subsequently effecting continuous vulcanisation of the assembly of cords and cover plies in a rotary continuous vulcanising apparatus, under controlled tension.

For best results in using the rotary continuous vulcanising apparatus it has been found desirable to arrange for the belt assembly to enter the space between the curing drum and the pre-heat drum on a line which is substantially tangential to both drums so that there is a minimum of pre-heating applied to the belt.

Adhesion of the elastomeric covers to the inextensible cords may be promoted by inclusion of a bonding agent or agents in the stock used for the elastomeric covers. Adhesion is also assisted by mechanical interlocking of the cover stock within the interstices of the cords. This may also be assisted by preliminary rubberising of the cords in a conventional cross head extruder.

A particularly efficacious method of achieving proper penetration of the material of the covers into the interstices of the cords comprises heating the cords, and/or the covers prior to the pressing operation.

Thus the invention also contemplates the inclusion of suitable pre-heating means in proximity to the cords and/or the covers, in advance of the platen press.

The invention further resides in effecting controlled tension upon the combined cords and covers prior to and during their advance through the rotary apparatus to maintain the position of the cords laterally and also to control their location relative to the cover faces.

It is to be understood that the operation of vulcanising need not necessarily be effected immediately after the cords and covers have emerged from the platen press, as material so prepared may be stored and/or transported, and subsequently subjected to the vulcanising step.

Other objects and features will be evident from the following description of a preferred form of the invention. In this description reference is made to the accompanying drawings, of which:

FIG. 1A and FIG. 1B are diagrammatic views showing together in plan apparatus for use in preparing a consolidated assembly of cords and cover plies, FIG. 2A and FIG. 2B are diagrammatic views showing together in elevation the aparatus shown in FIG. 1, and FIG. 3 is a diagrammatic view of a continuous rotary vulcanising apparatus provided with controlled tensioning means, for vulcanising the product of the apparatus shown in FIGS. 1A, 1B, 2A and 2B.

Referring firstly to FIGS. 1A and 2A, the drawings illustrate apparatus for making inextensible cord belting comprising a creel 11 which includes a plurality of reels 12. Each reel 12 is wound with cord 13 of steel or other suitable relatively inextensible material which is drawn off as required. The reels 12 are preferably provided with means (not shown) for controlling the drawing off of the cords 13.

The group of cords 13 is passed through guides 14 and 15 from which they extend forwardly in an evenly spaced arrangement in a common horizontal plane. The array of aligned cords 13 passes forwardly from the guides 14 and 15 through a stationary clamp 16 which serves to grip the cords extending between the jaws thereof, and which can be released when required to enable the cords to pass forwardly.

From the clamp 16 the cords 13 pass through a degreasing unit 17 for cleaning the exterior surface of the cords, and after traversing the unit 17 the cords 13 pass through a tensioning device 18 of known type which can be operated to apply tension to the cords when required.

Referring now to FIGS. 1B and 2B the cords 13 pass forwardly from the tensioner 18 through a comb plate 19 which is fixed in position and which narrows the width of the array of cords. This comb may be removed and another of different spacing substituted when it is desired to change the cord spacing.

Beyond the comb plate 19 the cords 13 pass into the zone of operation of a cold press 20 having upper and lower pressure plates extending respectively above and below the cords. The cold press 20 is supported upon longitudinally extending horizontal guide rails 21 enabling it to be moved backwards and forwards in the direction of movement of the cords 13, through a distance substantially equal to the full length of the press plates, and hydraulic piston and cylinder operating means 22 is provided to effect such movement of the cold press in sequence with its pressing operation.

The frame of the press 20 carries upper and lower brackets 23 and 24 at the end from which the cords 13 advance and these brackets support reels 25 and 26 respectively containing previously sheeted upper and lower cover plies 27 and 28. The upper cover ply 27 is carried downwardly and forwardly over a support 29 into the press 20 above the cords 13 while the lower cover ply 28 is carried upwardly and forwardly over a support 30 into the press 20 below the cords 13. The supports 29 and 30 are carried by a supporting structure 31 which extends from the end wall of the press 20 and which also carries a cowling or chamber 32 open at each end for the cords 13 to pass through it. The chamber 32 has a further comb 33 mounted at the outlet end thereof and it also has inlet and outlet ducts 34 and 35, which are flexible in part, connected to a heater unit 36 which serves to maintain a flow of heated air or gas to the chamber 32. The conditions are preferably arranged to achieve a temperature of about 200° F. for the cords 13 where they leave the chamber 32 and comb 33 immediately prior to being associated with the cover plies. Instead of gaseous heating of the cords they may be subjected to other heating means, for example radiant heating, or electric induction heating. As a further alternative the cover plies may be heated rather than the cords, and if desired both the cords and the cover plies may be heated. The purpose of the heating is to ensure adequate penetration of the rubber compound into the interstices of the cords and it is therefore more convenient and preferable for the cords to be heated since in this way the rubber compound of the cover plies is softened and made less viscous, only in the immediate vicinity of the cords, thereby ensuring that the physical character of the cover plies in regions away from the immediate vicinity of the cords is not changed.

Immediately adjacent the limiting position of the cold press 20 in the direction of advancement of the cords 13 there is disposed a further stationary clamp 37 which is provided with operating means (not shown) to enable it to grip the belt assembly 38 (comprising the cords 13 and cover plies 27 and 28) and to release it whenever required.

In advance of the clamp 37 there is provided a frame 39 supporting a reel 40 with power driving means 41 for winding up the belt assembly delivered from the press 20 and clamp 37.

In the operation of the form of apparatus so far described the cords 13 mounted on the reels 12 are led through the guides 14 and 15 the stationary clamp 16, the degreasing unit 17 and the tensioning device 18. They then pass through the heating means 32, and the comb 33, through the zone of operation of the cold press 20 and through the clamp 37 which follows the cold press. The cover plies also extend through the zone of operation of the cold press 20 and through the second clamp 37.

With the two clamps 16 and 37 closed, upon the cords at one end and upon the cords and cover plies at the other end, the tensioning device 18 is operated to apply tension to the cords and then the cold press 20 is disposed in its position furthest from the second clamp 37 and is operated to squeeze the cover plies together about the cords, for an appropriate interval. In practice it is found that using a consolidating pressure of the order of 500 to 600 lbs. per square inch for a pressing time of the order of five minutes produces a satisfactory result. Even better results have been achieved with a pressure of up to 800 lbs. per square inch in which case the pressing time can be reduced to three minutes. At the termination of the pressing operation the tension upon the cords 13 is removed, both clamps are released and while maintaining compression upon the consolidated portion of the belting the cold press 20 is moved to its opposite extreme position nearer to the second clamp 37. In so doing it draws the cords 13 forwardly with it.

The two clamps are then operated to grip the cords 11 and the assembly 38 again, tension is reapplied to the cords by the tensioning device 18 and then the cold press 20 is released and opened and returned to its initial position. In the course of this movement appropriate lengths of the cover plies 27 and 28 are unwound from the reels 25 and 26 and located within the press. The press is then reapplied to compress the further extent of the cover plies and cords within it. These operations are repeated sequentially so that there is an intermittent advancement of the assembly 38 of consolidated cover plies and cord from the region of the second clamp.

In an alternative arrangement, the cold press may be fixed in position and the second clamp mounted for reciprocating movement in the direction of advancement of the cords, in timed sequence with the operation of the press. With this arrangement the second clamp is disposed in its position nearest to the press, the second clamps are closed, and the tensioning system is operated to tension the cords. The press is then closed and the consolidating pressure is held for an appropriate period whereupon the pressure is relieved, the press is opened and the tensioning system is then operated to remove the tension in the cords. Thereupon the first clamp is released and the second clamp is advanced to its position furthest from the press thereby drawing the cords and the covers forwardly with it. The first clamp is then closed on the cords, full tension is applied to the cords by the tensioning system, the press is closed upon a further section of the cords and the covers and the second clamp is opened, the body of the clamp is moved to its position nearest the press and it is then closed upon the section of the cords and cover plies which has previously been consolidated in the press. These operations are repeated sequentially so that there is again an intermittent advancement of the consolidated cover plies and cord from the region of the second clamp.

The rolled-up unvulcanised assembly of consolidated cover plies and cord is taken from storage when required and delivered to vulcanising equipment such as a continuous rotary vulcanising apparatus wherein vulcanising of the belting is effected. In some conditions the assembly may be delivered directly to the vulcanising apparatus. Suitable rotary vulcanising apparatus is illustrated in FIG. 3 which also shows a group of tension rollers 42 for applying controlled tension to the consolidated unvulcanised assembly 38 prior to entering the rotary apparatus. Where the assembly 38 is delivered directly from the cold press 20 and second clamp 37 to the tension rollers 42 provision is made to enable the material to hang in a loop in order to provide for the taking up in a continuous fashion of the material which is supplied intermittently from the operation of the press.

The rotary vulcanising apparatus includes a curing drum 43, a pre-heat drum 44, and a curing band 45 which extends around the pre-heat drum 44, between it and the curing drum 43, around the latter and around further drums 46 and 47. It is arranged in relation to the tension rollers 42 so that the consolidated belt material 38 passing from the latter is delivered into the space between the curing drum 43 and the pre-heat drum 44, above the band 45, in a direction substantially tangential to both these drums. A group of support rollers 48 is mounted following the tension rollers 42 to support the belt assembly 38 and to preserve lateral alignment of it immediately up to the point of entry into the rotary vulcanising apparatus. The completed vulcanised belting emerges from the apparatus over the drum 47 where it is stripped from the band 45 and is wound into a roll 49.

If the assembly is to be vulcanised directly upon completion of the consolidation step, i.e. without intermediate rolling-up and storage, the cold pressing operation and the subsequent release of the belt assembly to the vulcanising apparatus must be carried out in a time not greater than the time required to vulcanise the equivalent length. Suitable curing conditions for the "Rotocure" type of vulcanising apparatus involve setting it so that the temperature in the curing drum is about 310° F. and that in the heating coils for the curing band is about 350° F., with a speed determined by the curing time required for the thickness of belting being vulcanised.

Normal edge bands are preferably fitted to the sides of the curing drum and adjusted to suit the dimensions of the assembled belting so that even edges are moulded on the vulcanised belting.

It is important that the cavity width and edge band thickness should be calculated as exactly as possible to restrict movement of the belting assembly in the cavity or excessive "spew" upsetting linearity of the cords.

Contrary to expectatioins it has been found that quite appreciable tension can be maintained on the cords during the passage of the assembly of cords and cover plies through the rotary vulcanising apparatus, without uncontrollable movement of the cords into the radially inner ply.

It has been found firstly that if there should be any slight variation in tension between individual cords prior to entry into the rotary vulcanising apparatus the movement of the cords in a part circular path within the latter apparatus enables the tension to be equalised throughout the cords by slight variation of the position of the cords relative to the surface of the radially inner ply. If by chance one of the cords in the built up assembly is tighter than the others then this cord will tend to move slightly towards the drum face as the assembly around the circumference of the drum itself. As the assembly extends around about three-quarters of a full turn of the drum a displacement of a cord by a distance of 1 mm. towards the drum axis achieves a length correction of approximately 5 mm. and this is found in practice to be quite sufficent to correct any variation in tension between the different cords.

The introduciton of the belt material 38 into the rotary vulcanising apparatus tangential to both the curing drum 43 and the pre-heat drum 44 ensures that it is kept from the heating effect of both drums as much as possible and it is still therefore relatively cold at the point of entry into the curing zone. At this point the tensile force applied to the material 38 has no lateral component to displace the cords 13 towards the drum 43. As the material 38 moves in the arcuate path around the drum 43 a radially-directed force builds up due to the tension. At the same time the plies are being heated and becoming more plastic and hence there is a tendency at this stage for the cords to move closer to the innermost surface of the belt material 38. However, curing of the rubber commences at about the same time with consequent changes of the physical properties including increased resistance to deformation and hence displacement of the cords is found to be resisted to a large extent. Thus displacement of the cords is confined to a limited region of the vulcanising zone, and furthermore it can be controlled by adjusting the tension of the belt assembly with the aid of the tension rollers 42.

Hence it has been found that while there may under some conditions be a general tendency for all the cords to move into the radially inner ply, such movement can be kept under control and the plies may be designed to take proper account of such movement. Thus the radially inner ply may be made thicker than the radially outer ply, the difference in thickness being such to ensure the cords have an appropriate location relative to the two faces of the completed belting.

I claim:

1. A method of making belts having plural reinforcing cords extending between cover plies of resilient material which comprises the steps of extending an array of cords in parallel relationship under tension so as to form a plane of cords, extending cover plies of resilient material one on each side of said tensioned array of cords, and compressing the cover plies and cords together in sections at a pressure in the range of 500 to 800 pounuds per square inch for a period of three to five minutes to form a belt having adequate mechanical properties for further transportation.

2. A method according to claim 1 in which the said step is carried out at a pressure of the order of 500–600 lbs. per square inch maintained for a period of the order of five minutes.

3. A method according to claim 1 in which the said step is carried out at a pressure of the order of 800 lbs. per square inch maintained for a period of the order of three minutes.

4. A method according to claim 1 wherein the said step is followed by vulcanising the assembly of cords and cover plies under a lower pressure.

5. A method according to claim 4 wherein the said assembly is rolled and stored following the said step and before vulcanisation is performed.

6. A method of producing cord reinforced belts which comprises extending an array of cords under tension, extending two cover plies one on each side of the array of cords, applying a pressure of 500 to 800 pounds per square inch for a period of three to five minutes by means of a platen press to compress the cover plies and cords together over sections of the cover plies and cords sequentially and maintaining the cords under tension during each compression, and effecting advancement of the cords and cover plies relative to the platen press between consecutive compressioins, by a distance not substantially greater than the length of each section.

7. A method according to claim 6 which includes subsequently effecting vulcanisation of the assembly of cords and cover plies.

8. A method according to claim 7 wherein each compression is carried out at a pressure of the order of 500–600 lbs. per square inch maintained for a period of the order of five minutes.

9. A method according to claim 7 wherein each compression is carried out at a pressure of the order of 800 lbs. per square inch maintained for a period of the order of three minutes.

10. A method according to claim 7 wherein the assembly of cords and cover plies is rolled and stored before vulcanisation.

11. A method according to claim 7 in which vulcanisation is carried out in a continuous rotary vulcanising apparatus.

12. A method according to claim 1 which comprises heating the cords prior to the pressing operation to effect penetration of the heat softened cover plies into the interstices of the cords.

13. A method according to claim 1 which comprises heating the cover plies prior to the pressing operation to effect penetration of the heat-softened cover plies into the interstices of the cords.

References Cited

UNITED STATES PATENTS

| | | | |
|---|---|---|---|
| 2,197,569 | 4/1940 | Kimmich | 156—137 |
| 2,296,372 | 9/1942 | Smith et al. | 156—137 X |
| 2,441,970 | 5/1948 | Lesesne | 156—137 |

CARL D. QUARFORTH, Primary Examiner

P. A. NELSON, Assistant Examiner

U.S. Cl. X.R.
156—309, 312, 322